J. ST. MARTIN.
NUT LOCK.
APPLICATION FILED APR. 21, 1914.

1,119,299.

Patented Dec. 1, 1914.

UNITED STATES PATENT OFFICE.

JAMES ST. MARTIN, OF NASHUA, NEW HAMPSHIRE.

NUT-LOCK.

1,119,299.  Specification of Letters Patent.  Patented Dec. 1, 1914.

Application filed April 21, 1914. Serial No. 833,466.

*To all whom it may concern:*

Be it known that I, JAMES ST. MARTIN, a citizen of the United States, residing at Nashua, in the county of Hillsboro and State of New Hampshire, have invented certain new and useful Improvements in Nut-Locks, of which the following is a specification.

My invention relates to nut locks.

The primary object of my invention resides in the provision of a locking device for a nut when in position on a bolt for preventing rotative and longitudinal movement of the latter and one that can be readily and easily applied and removed.

Another object of my invention resides in the provision of a nut lock which is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

Referring to the drawings:—Figure 1 represents a horizontal sectional view of my invention; Fig. 2 represents a top plan view of the same; and Fig. 3 represents a perspective view of the locking washer.

Referring more particularly to the drawings in which similar reference numerals designate corresponding parts throughout the different views, I provide an axle of a vehicle 1 with a reduced screw-threaded extension 2, the latter having removably engaged thereon a nut 3, the under surface of which is provided with an annular recess 4 for the reception of the enlarged portion of the axle 1 and the inner surface 5 of the nut constitutes a bearing surface for the hub of a vehicle wheel, not shown. Although I am describing my invention as a locking device in connection with the axle of a vehicle, it is obvious that the screw-threaded extension 2 is substantially similar to the outer screw-threaded end of a bolt.

The extreme outer end of the screw-threaded extension 2 is reduced to provide a neck 6 which has formed on the extreme outer end thereof an annular head 7 of a diameter slightly less than the diameter of the extension 2. The inner face of the head is arranged in spaced parallel relation with the outer face of the extension and the space between the same constitutes an annular groove 8 for the reception of my improved locking washer 9. The washer in this instance constitutes essentially a preferably annular blank formed from sheet metal, the blank being provided with a central opening 10 for engagement with the neck 6. In order that the washer may be readily inserted upon the neck 6 I have provided the same with a lateral slot 11 the sides of which are diverged and slightly curved as at 12. When the washer 9 is being placed in position in the groove 8, the curved sides of the slot 11 will engage the outer surface of the neck 6 and as the washer is formed of resilient sheet metal the portions adjacent the slot will be forced away from each other due to the pressure used in placing the washer in position until the extreme inner end of the slot has been passed about the neck, where they will then come together and clamp the neck. As the washer is held in place by the head 7 which bears against one side of the same and as the washer is larger in diameter than the diameter of the extension when the washer is in position in the groove 8 the opposite side of the same bears against the outer face of the nut which is in alinement with the outer face of the extension and prevents the nut from movement upon the bolt. When it is desired to remove the nut from the bolt, the thumbs and the index fingers of the user are placed upon the curved sides of the slot and the portions adjacent the slot are forced apart until the inner edges of the same have passed over the neck.

From the above description taken in connection with the accompanying drawings it can easily be seen that I have provided a locking device for a nut that is readily attached and removed from a bolt and one that contains but a few simple parts that can be easily manufactured and placed on the market and sold at a minimum cost.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my inven- tion, what I claim as new and desire to secure by Letters Patent is:—

In combination with a threaded shank provided with an annular groove adjacent one end thereof, and a nut on the shank, a locking washer formed from a blank of resilient sheet metal and provided with a central opening, said washer further provided with a transverse slot extending from said opening to the outer edge thereof, the sides of said slot being divergent and curved for guiding said washer into engagement with said groove and for holding the nut in position on the shank.

In testimony whereof I affix my signature in presence of two witnesses.

JAMES ST. MARTIN.

Witnesses:
JOHN B. PELLETIER,
YVONNE A. PEME.